(12) United States Patent
LaCivita (10) Patent No.: US 9,091,099 B2
(45) Date of Patent: Jul. 28, 2015

(54) APPARATUSES AND METHODS FOR SECURING FISHING RODS AND REELS

(71) Applicant: Frank John LaCivita, Sarasota, FL (US)

(72) Inventor: Frank John LaCivita, Sarasota, FL (US)

( * ) Notice: Subject to any disclaimer, the term of this patent is extended or adjusted under 35 U.S.C. 154(b) by 158 days.

(21) Appl. No.: 13/886,742

(22) Filed: May 3, 2013

(65) Prior Publication Data

US 2014/0326026 A1 Nov. 6, 2014

(51) Int. Cl.
*E05B 73/00* (2006.01)
*A01K 87/06* (2006.01)
*E05B 65/48* (2006.01)
*E05B 17/20* (2006.01)

(52) U.S. Cl.
CPC .............. *E05B 73/00* (2013.01); *A01K 87/06* (2013.01); *E05B 17/2084* (2013.01); *E05B 65/48* (2013.01); *Y10T 70/5009* (2015.04)

(58) Field of Classification Search
CPC ..... E05B 73/00; E05B 65/48; E05B 17/2084; A01K 87/06; Y10T 70/5009
USPC .......... 70/14, 16, 18, 19, 52–54, 57, 58, 232, 70/158, 163–173, 175–184, 201–203, 70/201–20
See application file for complete search history.

(56) References Cited

U.S. PATENT DOCUMENTS

| | | | |
|---|---|---|---|
| 2,953,251 A | 9/1960 | Stone | |
| 3,101,695 A * | 8/1963 | Honeyman, Jr. | 114/230.29 |
| 3,204,362 A | 9/1965 | Andrews | |
| 3,401,543 A * | 9/1968 | Lewis | 70/183 |
| 3,740,977 A * | 6/1973 | Stefansen et al. | 70/16 |
| 3,901,056 A * | 8/1975 | Coolidge | 70/19 |
| 4,008,585 A * | 2/1977 | Lundberg | 70/164 |
| 4,057,983 A * | 11/1977 | Morgan | 70/18 |
| 4,063,646 A | 12/1977 | Stahl, Jr. | |
| 4,085,599 A * | 4/1978 | Fischer et al. | 70/14 |
| 4,254,888 A * | 3/1981 | Chandler | 220/694 |
| 4,296,615 A * | 10/1981 | Zoor | 70/19 |
| 4,506,528 A * | 3/1985 | Eberly | 70/18 |
| 4,541,256 A * | 9/1985 | Green | 70/232 |
| 4,592,578 A * | 6/1986 | Martin | 292/40 |
| 4,611,478 A * | 9/1986 | Carlson et al. | 70/164 |
| 4,702,093 A * | 10/1987 | DeWalch | 70/164 |
| 4,704,881 A * | 11/1987 | Sloop, Sr. | 70/158 |
| 4,774,823 A * | 10/1988 | Callison | 70/14 |
| 4,813,252 A * | 3/1989 | Ray | 70/18 |
| 4,896,518 A * | 1/1990 | Appelgren | 70/54 |
| 4,955,215 A * | 9/1990 | Eremita | 70/18 |
| 5,115,834 A * | 5/1992 | Champagne | 137/385 |
| 5,154,440 A * | 10/1992 | Dolan et al. | 280/507 |
| 5,182,928 A * | 2/1993 | O'Fearna | 70/232 |
| 5,207,315 A * | 5/1993 | Benda | 200/43.11 |
| 5,291,765 A * | 3/1994 | Hoisington | 70/233 |
| 5,361,611 A | 11/1994 | Hisler | |
| 5,363,677 A * | 11/1994 | Cox | 70/18 |
| 5,412,962 A * | 5/1995 | Thompson | 70/178 |
| 5,435,473 A | 7/1995 | Larkum | |
| 5,460,306 A | 10/1995 | Rudd | |
| 5,544,505 A * | 8/1996 | McIntosh et al. | 70/18 |
| 5,642,635 A * | 7/1997 | Wen-Chyun | 70/46 |
| 5,746,074 A * | 5/1998 | Collins | 70/18 |

(Continued)

*Primary Examiner* — Christopher Boswell
*Assistant Examiner* — Morgan McClure
(74) *Attorney, Agent, or Firm* — Adams and Reese LLP (57) ABSTRACT

Apparatuses and methods are provided to secure fishing reels to fishing rods. Interlocking apparatuses and methods are provided to secure fishing reel/rod combinations against theft.

23 Claims, 11 Drawing Sheets

(56) References Cited

U.S. PATENT DOCUMENTS

| | | | |
|---|---|---|---|
| 5,787,739 A * | 8/1998 | Derman | 70/58 |
| 5,887,461 A * | 3/1999 | Heffley | 70/18 |
| 6,000,249 A * | 12/1999 | Wilber | 70/16 |
| 6,038,891 A * | 3/2000 | Zeren et al. | 70/58 |
| 6,053,016 A * | 4/2000 | Young | 70/57 |
| 6,263,709 B1 * | 7/2001 | Kemery et al. | 70/14 |
| 6,393,875 B1 * | 5/2002 | Garel et al. | 70/18 |
| 6,430,973 B1 * | 8/2002 | Huang | 70/18 |
| 6,530,170 B1 | 3/2003 | Sweeney | |
| 6,601,413 B1 * | 8/2003 | Vito | 70/56 |
| 6,604,390 B1 * | 8/2003 | Nooner | 70/63 |
| 6,619,084 B2 * | 9/2003 | Kuo | 70/233 |
| 6,848,284 B2 * | 2/2005 | Chen | 70/56 |
| 6,902,080 B2 * | 6/2005 | Busch | 220/315 |
| 6,928,843 B1 * | 8/2005 | Pirnie | 70/54 |
| 7,032,416 B1 * | 4/2006 | Wu | 70/19 |
| 7,100,937 B2 * | 9/2006 | Hogan | 280/507 |
| 7,219,464 B1 | 5/2007 | Kujawa | |
| 7,650,767 B2 * | 1/2010 | Robinson | 70/34 |
| 7,937,975 B2 * | 5/2011 | Kolton et al. | 70/57.1 |
| 8,011,213 B1 * | 9/2011 | Gogel | 70/56 |
| 8,201,506 B1 * | 6/2012 | Parlapiano | 109/50 |
| 8,632,103 B2 * | 1/2014 | Fahie et al. | 285/80 |
| 8,800,331 B1 * | 8/2014 | Sofianos | 70/164 |
| 2002/0078719 A1 * | 6/2002 | Mitchell et al. | 70/18 |
| 2004/0118170 A1 * | 6/2004 | Smith et al. | 70/178 |
| 2004/0172990 A1 * | 9/2004 | O'Rouke | 70/58 |
| 2005/0172681 A1 * | 8/2005 | Tonelli | 70/33 |
| 2005/0262908 A1 * | 12/2005 | Parker | 70/177 |
| 2006/0123856 A1 * | 6/2006 | Loughlin et al. | 70/18 |
| 2006/0254118 A1 | 11/2006 | Warecke | |
| 2006/0272369 A1 * | 12/2006 | Stachowiak, Jr. | 70/164 |
| 2007/0125137 A1 * | 6/2007 | Galant | 70/58 |
| 2007/0220932 A1 * | 9/2007 | Meekma et al. | 70/164 |
| 2007/0271971 A1 * | 11/2007 | Johnson | 70/58 |
| 2007/0283730 A1 * | 12/2007 | Kolton et al. | 70/57.1 |
| 2008/0034816 A1 * | 2/2008 | Lu | 70/58 |
| 2008/0209963 A1 * | 9/2008 | Trempala | 70/167 |
| 2009/0120510 A1 * | 5/2009 | Evans et al. | 137/383 |
| 2009/0126425 A1 * | 5/2009 | Stachowiak, Jr. | 70/163 |
| 2009/0158791 A1 * | 6/2009 | Hudman et al. | 70/232 |
| 2010/0135716 A1 * | 6/2010 | Shalaby | 403/110 |
| 2010/0212377 A1 * | 8/2010 | Graglia | 70/183 |
| 2010/0319416 A1 * | 12/2010 | Eller, Jr. | 70/164 |
| 2011/0031293 A1 * | 2/2011 | Weber | 224/555 |
| 2011/0048083 A1 * | 3/2011 | Adolph | 70/58 |
| 2011/0154868 A1 * | 6/2011 | Eizen et al. | 70/164 |
| 2011/0232339 A1 | 9/2011 | Norman | |
| 2012/0240641 A1 * | 9/2012 | Fong | 70/58 |
| 2013/0192314 A1 * | 8/2013 | Cheng | 70/16 |
| 2013/0247624 A1 * | 9/2013 | DeWalch et al. | 70/164 |
| 2013/0278411 A1 * | 10/2013 | DiBella et al. | 340/527 |
| 2014/0260440 A1 * | 9/2014 | Lash | 70/16 |
| 2014/0305175 A1 * | 10/2014 | Irwin | 70/14 |

* cited by examiner

APPARATUSES AND METHODS FOR SECURING FISHING RODS AND REELS

FIELD

The present disclosure relates generally to securing rods and reels. In exemplary though non-limiting embodiments, the present disclosure relates to improved apparatuses and methods to secure fishing reels to fishing rods and secure fishing rod/reel combinations against theft.

BACKGROUND

Fishing equipment, including rods and reels mounted on the rods, increasingly are of substantial value and are often targets for theft. Generally, fishing reels are designed independent of fishing rods and are designed such that reels may be secured to a variety of rods. Typically, a reel includes a base structure (reel foot) that mates with a surface of the rod (reel seat). A reel usually has a reel neck ending in the reel foot which may be mated to the real seat of the rod. Typically, rods will include one or more locking rings configured to slide over a portion of the reel foot to secure the reel foot to the rod. One or both of the locking rings may be configured to thread over a threaded surface of the rod or part of the reel seat such that the locking rings may be threaded in place over the reel foot to secure the reel in place. Typically, a locking ring on a bottom portion of the reel seat is configured to thread upward over the reel seat until the reel foot is secured into both locking rings. Reels may be removed from a rod by sufficiently loosening one or more the locking rings until the reel foot is free to pass away from the locking rings.

An angler may employ numerous rod/reel combinations on any given fishing outing. The rod/reel combinations often are transported to either a site of the expedition or to a fishing vessel. Although reels are usually removable from a particular rod, typically, rods and reels are transported in an assembled combination for convenience and time purposes. Often, the rod/reel combinations are left unattended during transport and/or when placed on the fishing vessel. Even after being installed in rod holders, the rod/reel combinations are often left unattended for periods of time, which may be overnight when a vessel is docked at a marina or similar.

Although the rod/reel combinations may be disassembled for storage and/or transport and assembled combinations may also be moved into a secure location for storage, constant disassembly and assembly and/or loading and unloading of the rod/reel combinations is usually considered a burden for an angler. For example, an angler on a five day near shore fishing trip using a fishing vessel that will be docked each night at a marina may find himself/herself forced to load and unload numerous rod/reel combinations each day in order to prevent theft of these expensive pieces of equipment.

Current devices for securing fishing equipment typically require some transportation of the rod/reel combination or involve a rod holder apparatus that may secure a rod and/or reel to the holder. Other devices may secure a reel to a rod and/or another object but do not prevent access and/or manipulation of the locking rings, allowing the rod/reel combination to be disassembled and potential theft of the rod, the reel or both.

Accordingly, there is need for an improved apparatus to secure rods and reels in combination and to further secure the combination to another object to prevent theft.

SUMMARY

In an embodiment of the present invention, a fishing rod and fishing reel locking device is provided, including: a first member, including a side member, a first wrapping member extending from the side member, a second wrapping member extending from the side member, and a first securing aperture; a second member, including a plate, a first hook extension extending from the plate, a second hook extension extending from the plate, and a second securing aperture; and a latch, including a third securing aperture and a fourth securing aperture. The first wrapping member and the second wrapping member are curved and are configured to wrap around the rod. The first wrapping member has a first hook aperture. The second wrapping member has a second hook aperture. The first hook extension is configured to pass through the first hook aperture. The second hook extension is configured to pass through the second hook aperture. The first member and the second member are configured to be interlocked via the first hook extension and the first hook aperture and via the second hook extension and the second hook aperture. The first securing aperture and the second securing aperture are configured to align when the first member and the second member are interlocked. The latch is configured to overlie a portion of the first member and the second member such that the first securing aperture and the second securing aperture are aligned with and in between the third securing aperture and the fourth securing aperture.

The device may further include: a flange portion attached to the side member of the first member; and a flange portion attached to the plate of the second member. The first securing aperture may be part of the flange portion of the first member. The second securing aperture may be part of the flange portion of the second member. The latch may be attached to the first member. The latch may be attached to the second member. The latch may be configured to rotate along an axis.

The device may further include a security cable passed through each of the security apertures. A gap width between adjacent edges of the first wrapping member and the second wrapping member may be configured to allow a neck of the reel to pass between the first wrapping member and the second wrapping member when the first member is wrapped around the rod. The gap width may be approximately 1 inch. The gap width may be approximately 1.5 inches.

The first wrapping member may have a first wrapping member width configured to cover a top portion of a reel seat. The first wrapping member width may be approximately 1 inch. The first wrapping member width may be one of approximately 1.5 inches, approximately 2 inches and approximately 3 inches. The second wrapping member may have a second wrapping member width configured to cover a bottom portion of a reel seat. The second wrapping member width may be approximately 2.5 inches. The second wrapping member width may be approximately 3 to approximately 4 inches.

According to an embodiment of the present invention, an apparatus is provided, including: a first member; a second member configured to interlock with the first member; and a latch member. Each of the first member, the second member, and the latch member have securing apertures configured to overlie each other such that a security chain may be passed through each of the securing apertures when securing a fishing rod and a fishing reel.

The first member may include a first wrapping member and a second wrapping member. The first member may further include a first hook aperture and a second hook aperture. The second member may further include a first hook extension and a second hook extension. The first member and the second member may be configured to cover a first and a second locking ring, respectively, of the fishing rod.

According to an embodiment of the present invention, a method of securing a fishing rod/reel combination is provided, including: wrapping a first member having a first wrapping member and second wrapping member around the rod such that a neck of the reel lies between the first wrapping member and the second wrapping member; interlocking a second member with the first member via first and second hook extensions and first and second hook apertures; rotating the second member and first member together such that a first securing aperture of the first member and a second securing aperture of the second member substantially align; placing a latch around a portion of the first member and a portion of the second member such that the first securing aperture and the second securing aperture substantially align with a third securing aperture and a fourth securing aperture of the latch; and passing a security chain through each of the securing apertures. The method may further include securing the security chain to a third object.

DESCRIPTION

Like reference characters denote like parts in the drawings.

Embodiments of the present disclosure provide improved apparatuses and methods to secure a fishing reel to a fishing rod. Embodiments provide an improved apparatus to secure rod/reel combinations to another object (e.g., a boat or motor vehicle). Embodiments may incorporate a security cable/chain, padlock or similar to secure the apparatus and enclosed rod/reel combination to another object. Embodiments may enable rod/reel combinations to be securely attached to rod holders. Embodiments of the present disclosure may prohibit access to and/or manipulation of locking rings of a fishing rod when embodiments are secured around a rod/reel combination. Embodiments of the present disclosure provide a substantially secure clasp around a rod/reel combination utilizing interlocking members.

Figure 1:
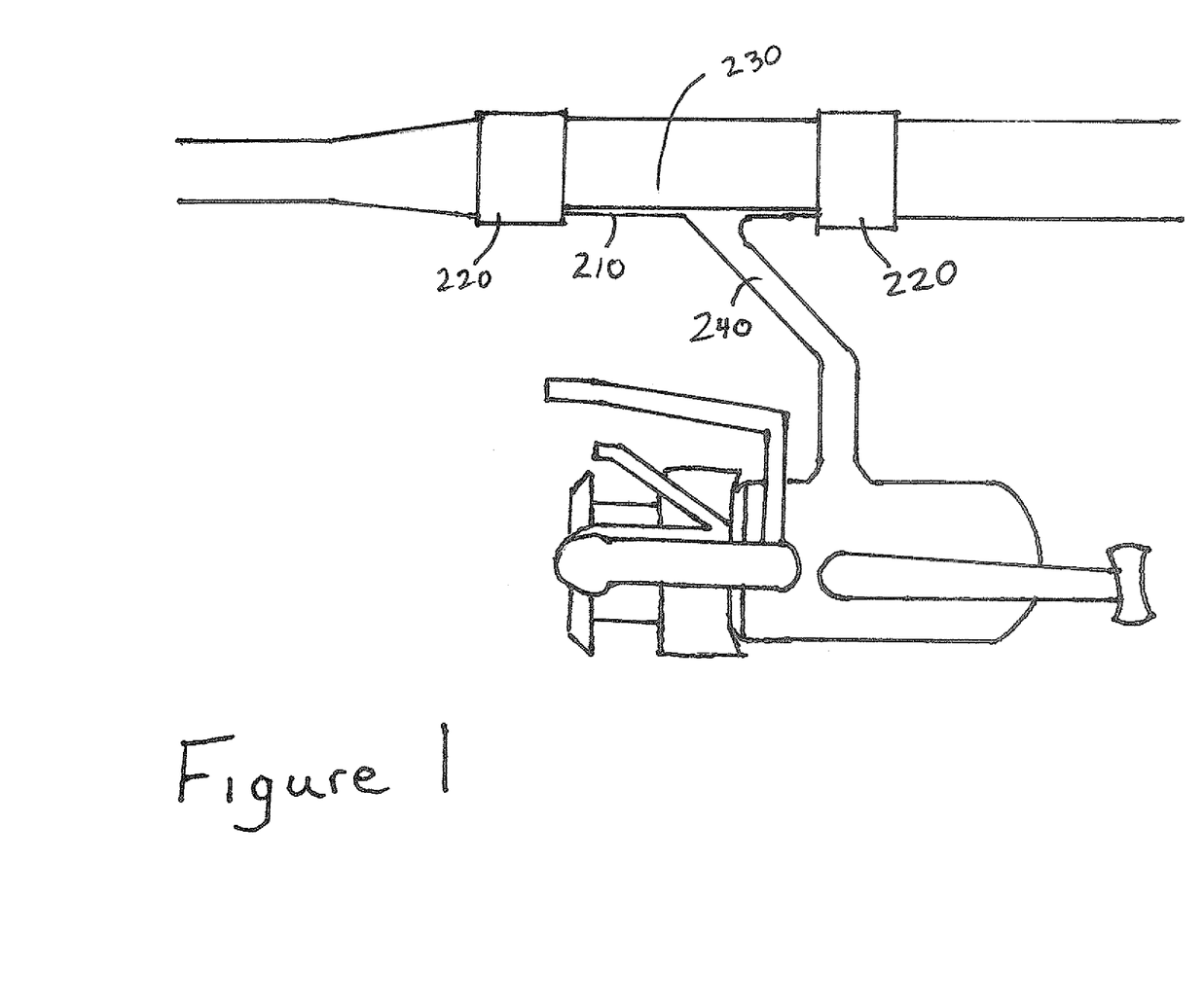
FIG. 1 is a side view of a rod/reel combination according to an exemplary embodiment of the present invention.

FIG. 1 shows a rod/reel combination with a reel having reel neck 240 ending in reel foot 210 which is mated to reel seat 230 of a rod. Locking rings 220 are configured to slide over a portion of reel foot 210 securing reel foot 210 to the rod. One or both of the locking rings 220 may be configured to thread over a threaded surface of the rod near or part of the reel seat 230 such that the locking rings 220 may be threaded in place over the reel foot 210 to secure the reel in place.

Figures 2A, 2B, 2C:
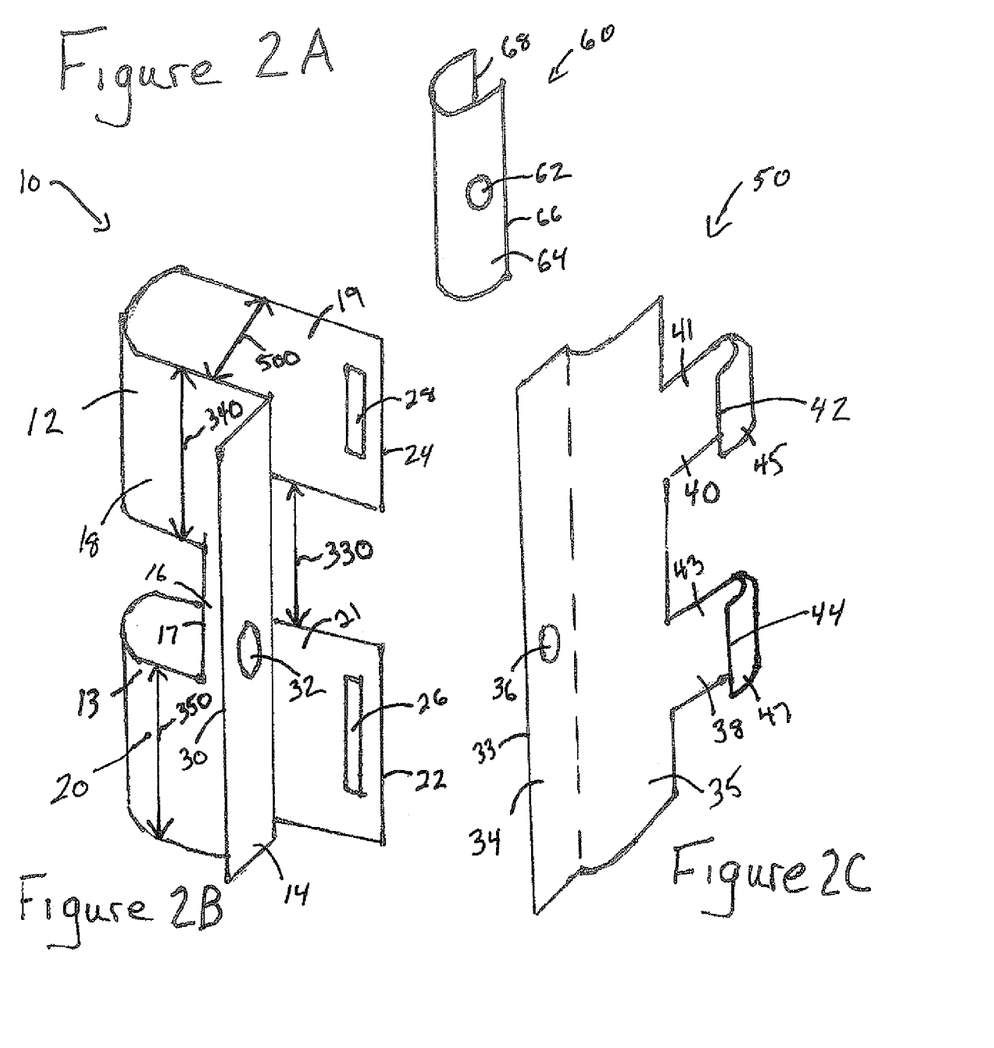
FIG. 2A is an isometric view of a latch according to an exemplary embodiment of the present invention.
FIG. 2B is an isometric view of a first member of a locking device according to an exemplary embodiment of the present invention.
FIG. 2C is an isometric view of a second member of a locking device according to an exemplary embodiment of the present invention.

FIGS. 2A through 2C are isometric views of members of a locking device according to an exemplary embodiment of the present disclosure. FIG. 2B shows an embodiment of first member 10 having a first flange portion 14 which is substantially perpendicular to side member 16. First flange portion 14 includes first securing aperture 32 and edge 30. Extending from side member 16 are first wrapping member 18 and second wrapping member 20. First wrapping member 18 and second wrapping member 20 are separated by edge 17 and gap width 330, and first wrapping member 18 and second wrapping member 20 run substantially parallel. First wrapping member 18 and second wrapping member 20 are curved such that tailing portions 19 and 21 are substantially parallel to side member 16.

In some embodiments, tailing portions 19 and 21 may extend beyond a plane that corresponds with first flange 14. Tailing portions 19 and 21 include first hook aperture 28 and second hook aperture 26 which may be substantially near first tailing edge 24 and second tailing edge 22. Curvatures of first wrapping member 18 and second wrapping member 20 may be configured to accommodate a fishing rod, and gap width 330 may be configured such that a reel neck may pass between adjacent edges of first wrapping member 18 and second wrapping member 20. Gap width 330 may be approximately 1 inch, which may accommodate reels designed for near shore or in shore fishing. In other embodiments, gap width 330 may be approximately 1.5 inches and may accommodate larger reel necks. Different gap widths 330 may be configured such that a reel neck will pass between adjacent edges of first wrapping member 18 and second wrapping member 20 while minimizing gap width 330 to limit movement and manipulation of a rod/reel combination and/or access to locking rings.

First wrapping member 18 may have first wrapping member width 340 configured to substantially cover a top portion of a reel seat and/or prohibit access to a top locking ring when first wrapping member 18 is secured around a rod/reel combination. In certain embodiments, first wrapping member width 340 may be approximately 1 inch which embodiments may be employed to in shore and/or near shore rod/reel combinations. In other embodiments, first wrapping member width 340 may be one of approximately 1.5 inches, approximately 2 inches and approximately 3 inches.

Second wrapping member 20 may have second wrapping member width 350 configured to substantially cover a bottom portion of a reel seat and/or prohibit access to a bottom locking ring when second wrapping member 20 is secured around a rod/reel combination. In certain embodiments, second wrapping member width 350 may be approximately 2.5 inches which embodiments may be employed to in shore and/or near shore rod/reel combinations. In other embodiments, second wrapping member width 350 may be approximately 3 to approximately 4 inches.

FIG. 2C is an embodiment of second member 50 having first hook extension 40 and second hook extension 38. First hook extension 40 and second hook extension 38 extending from plate 35. First hook extension 40 and second hook extension 38 are curved such that tailing portions 45 and 47 are substantially parallel to leading portions 41 and 43 as first hook extension 40 and second hook extension 38 end at edges 42 and 44. First hook extension 40 and second hook extension 38 may be more or less curved than shown in FIG. 2C. Second member 50 also includes second flange 34 having edge 33. Second flange 34 is connected to plate 35 which may be via curvature of plate 35 as shown in FIG. 2C. Second flange 34 includes second securing aperture 36.

Second member 50 is configured such that edges 42 and 44 may be passed through first hook aperture 28 and second hook aperture 26 of first member 10. Once edges 42 and 44 are passed through first hook aperture 28 and second hook aperture 26, first hook extension 40 and second hook extension 38 may be further passed through first hook aperture 28 and second hook aperture 26 allowing for second member 50 and first member 10 to be rotated together. Second member 50 and first member 10 may be joined at abutting surfaces of first flange 14 and second flange 34 such that edges 33 and 30 are substantially aligned and first securing aperture 32 and second securing aperture 36 substantially overlie each other.

As shown in FIG. 2A, latch 60 may be a curved piece 64 having a first edge 68, second edge 66, third securing aperture 62 and a fourth securing aperture 80 (not shown). Latch 60 may be configured such that, when first member 10 and second member 50 are interlocked via first hook extension 40 and second hook extension 38 passing through first hook aperture 28 and second hook aperture 26, hatch 60 may be slid in place over first flange 14 and second flange 34 until first securing aperture 32, second securing aperture 36, third securing aperture 62 and fourth securing aperture 80 substantially align. First securing aperture 32, second securing aperture 36, third securing aperture 62 and fourth securing aperture 80 are configured such that a security cable, padlock or similar may be passed through each securing aperture when aligned, securing each member of the apparatus together.

The embodiment shown in FIGS. 2A through 2C may be used to secure a rod/reel combination. First member 10 may be placed around a rod/reel combination by wrapping first wrapping member 18 and second wrapping member 20 around the rod with a neck 240 of the reel passing between wrapping first wrapping member 18 and second wrapping member 20 having a gap width 330. Gap width 330 may be approximately 1 inch, which may accommodate most reel necks. In other configurations, gap width 330 may be approximately 1.5 inches. First member 10 may be rotated in place such that the reel neck 240 extends away from first tailing edge 24 and second tailing edge 22. Second member 50 may then be interlocked with first member 10 as discussed above and latch 60 may be placed over first and second flanges 14 and 34 allowing for the rod/reel configuration to be secured with a security cable or similar. First wrapping member 18 and second wrapping member 20 may be curved such that leading portions 12 and 13 are separated from tailing portions 19 and 21 by interior distance 500 which may be configured to accommodate a diameter of a rod. Interior distance 500 may be approximately 1⅜ inches to approximately 1.5 inches. Interior distance 500 may be configured such that a rod will fit securely within the curvature of first member 10 with minimal free room for manipulation and/or movement when the present invention is secured around a rod/reel combination.

Figure 3:
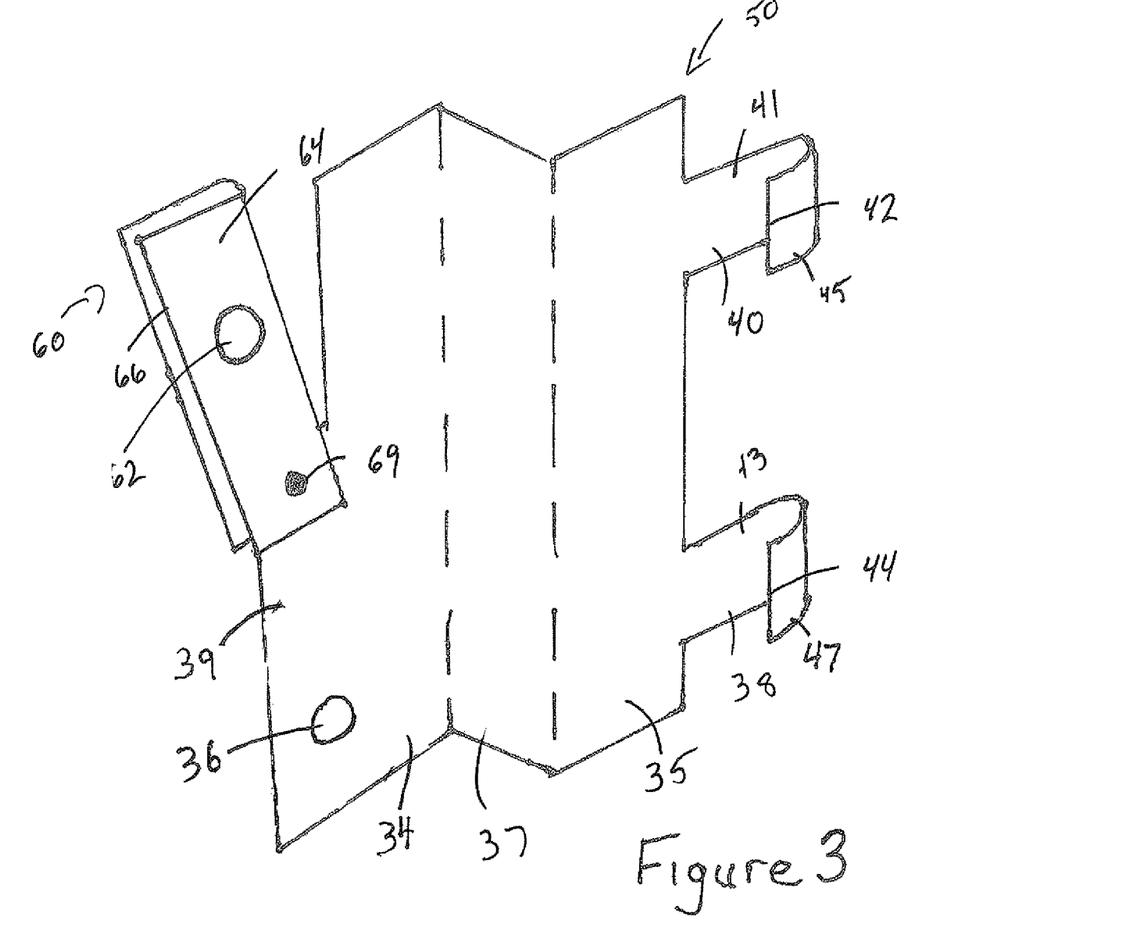
FIG. 3 is an isometric view of a second member of a locking device according to an exemplary embodiment of the present invention.
Figure 4:
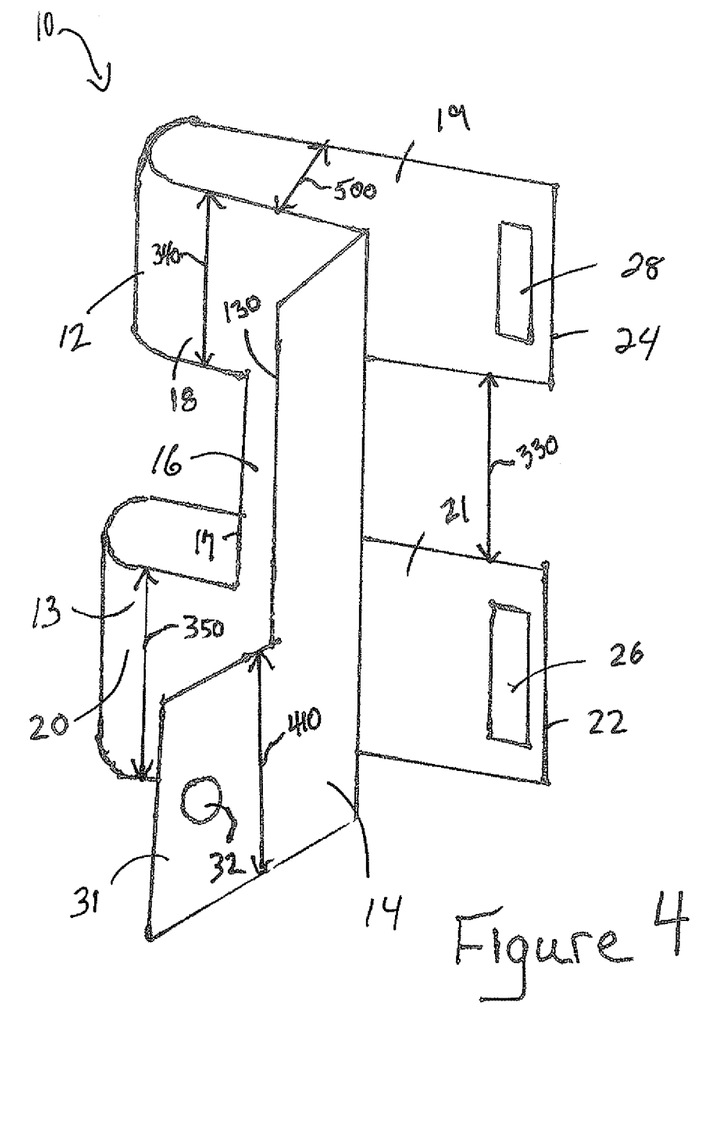
FIG. 4 is an isometric view of a first member of a locking device according to an exemplary embodiment of the present invention.
Figure 5:
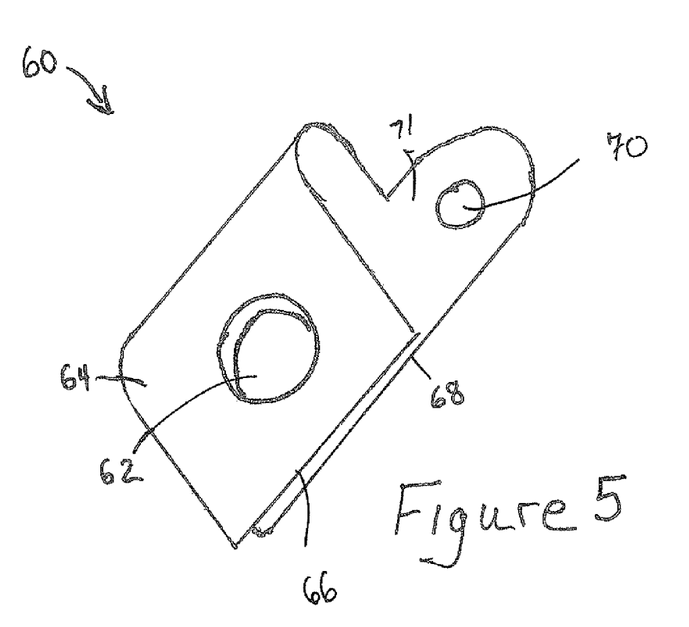
FIG. 5 is an isometric view of a latch according to an exemplary embodiment of a the present invention.

FIGS. 3 through 5 are isometric views of an alternate embodiment of the present disclosure. As shown in FIG. 4, first member 10 of this embodiment includes first member extension 31 of first flange 14 and first securing aperture 32 is located on first member extension 31. As shown in FIG. 3, second member 50 of this embodiment may include a second plate portion 37 joining plate 35 to second flange 34. Second plate portion 37 may be substantially perpendicular to plate 35 and second flange 34. Second member 50 may also include second member extension 39 of second flange 34 as shown. Second securing aperture 36 may be incorporated into second member extension 39 of this embodiment. As also shown, latch 60 may be attached to a top portion of second member extension 39 via pin 69 which may be a bolt, pin or other structure attaching latch 60 to second member 50 such that latch 60 may be rotated on an axis formed by pin 69. In this embodiment, latch 60 may be rotated into place over first member extension 31 and second member extension 39 such that first securing aperture 32, second securing aperture 36, third securing aperture 62 and fourth securing aperture 80 substantially align.

As shown, second member extension 31 has a second member extension width 410 substantially less than a first member extension width 420 such that latch 60 may freely rotate when first member 10 and second member 50 are interlocked and first flange 14 and second flange 34 abut. Alternatively, FIG. 5 provides an embodiment of latch 60 having extension 71 and pin aperture 70. In this embodiment, latch 60 may be attached to second member 50 via pin 69 passing through pin aperture 70. As shown in this embodiment, latch 60 may freely rotate when first member extension 31 and second member extension 39 are joined even if first member extension 31 and second member extension 39 have substantially similar widths.

Although shown as being attached to second member 60, embodiments of the present disclosure may attach latch 60 to first member 10. In further embodiments, latch 60 may be attached directly to first flange 14 or to second flange 34 without extensions incorporated therein. Embodiments may include configurations of first flange 14 and second flange 34 having corresponding widths to accommodate rotation of an attached latch 60 similar to the corresponding extension widths (410 and 420) shown in FIGS. 2 and 3. Embodiments having latch 60 attached to directly first flange 14 or to second flange 34 may incorporate a latch 60 similar to that shown in FIG. 5.

Figure 6:
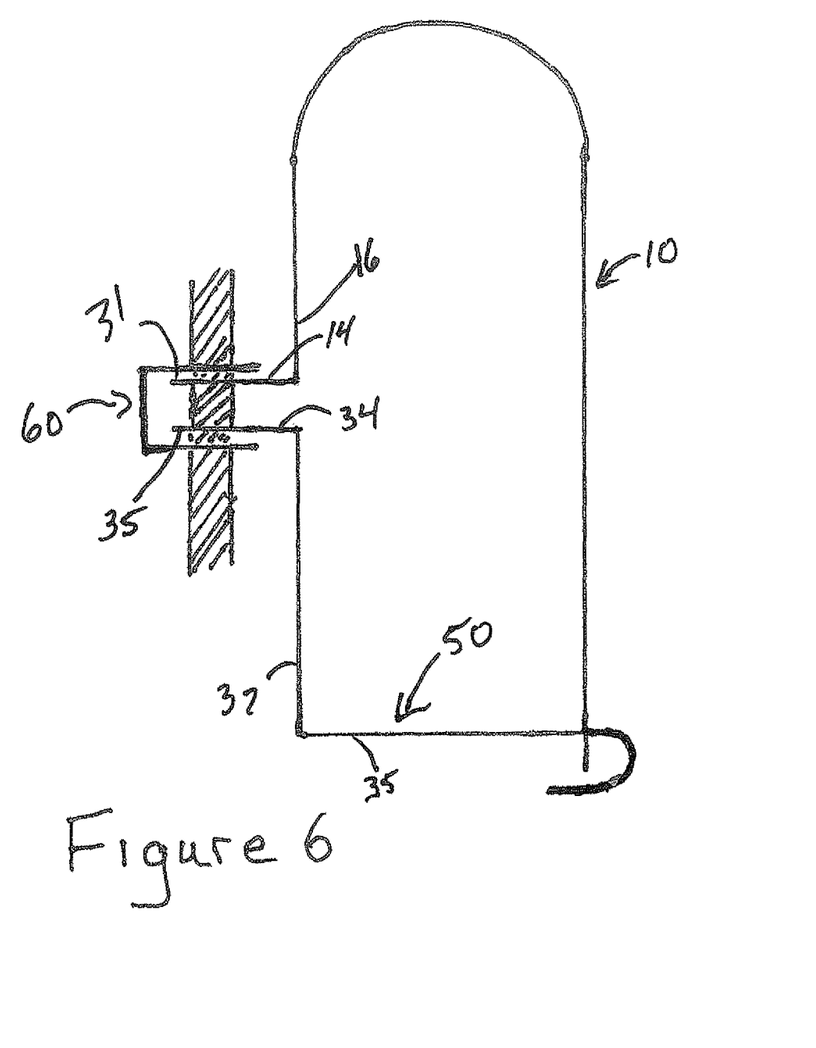
FIG. 6 is a top view of a locking device showing a first member, a second member, and a latch in combination according to an exemplary embodiment of the present invention.
Figure 7:
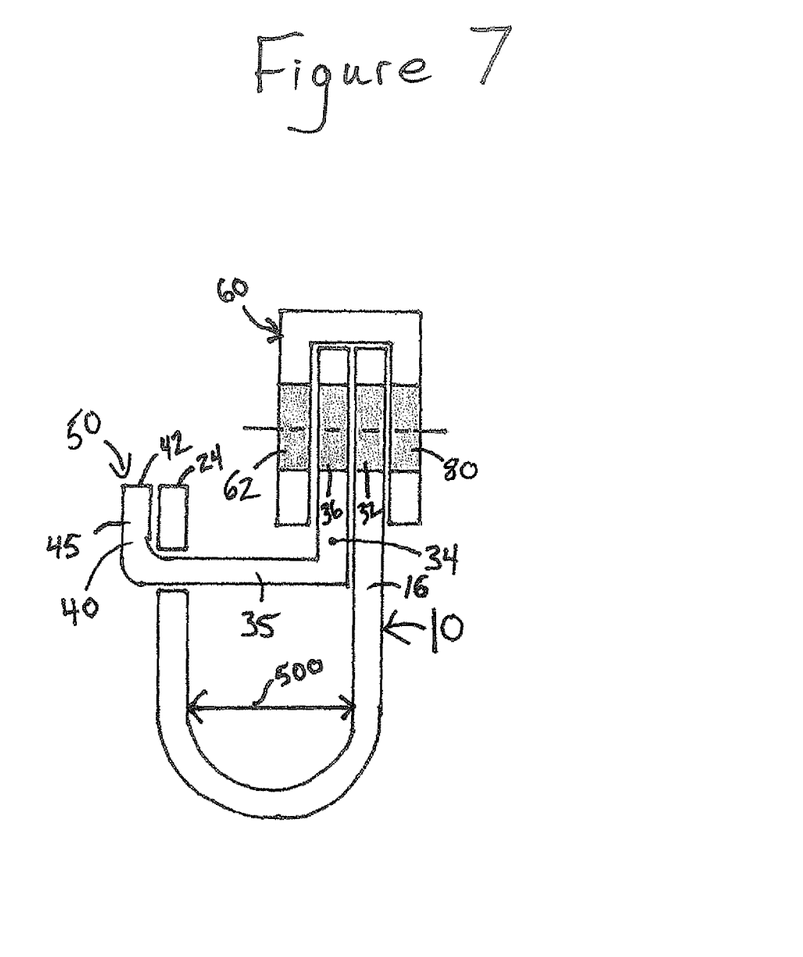
FIG. 7 is a top view of a locking device showing a first member, a second member, and a latch in combination according to an exemplary embodiment of the present invention.
Figure 8:
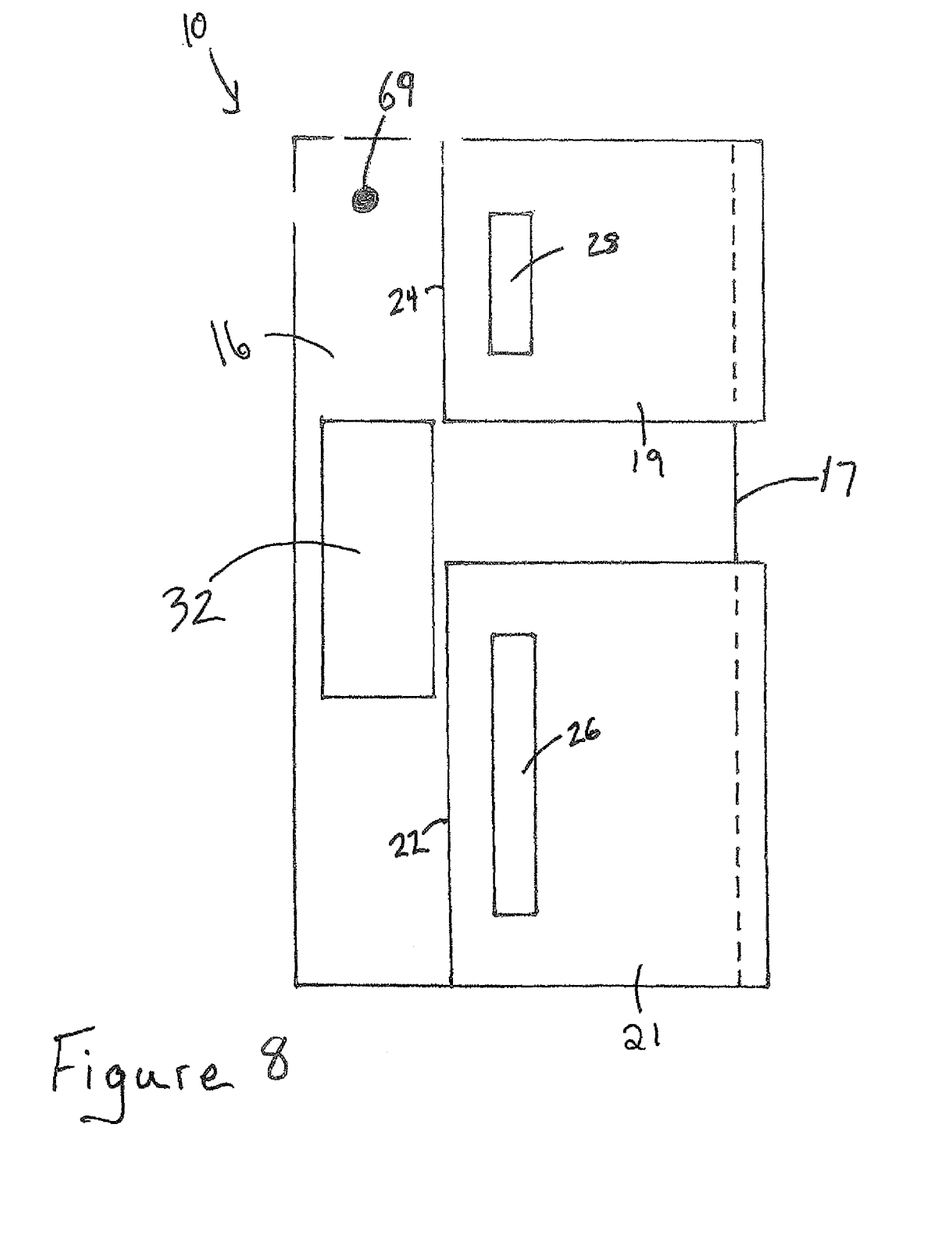
FIG. 8 is side view of the first member shown in FIG. 7.
Figure 9:
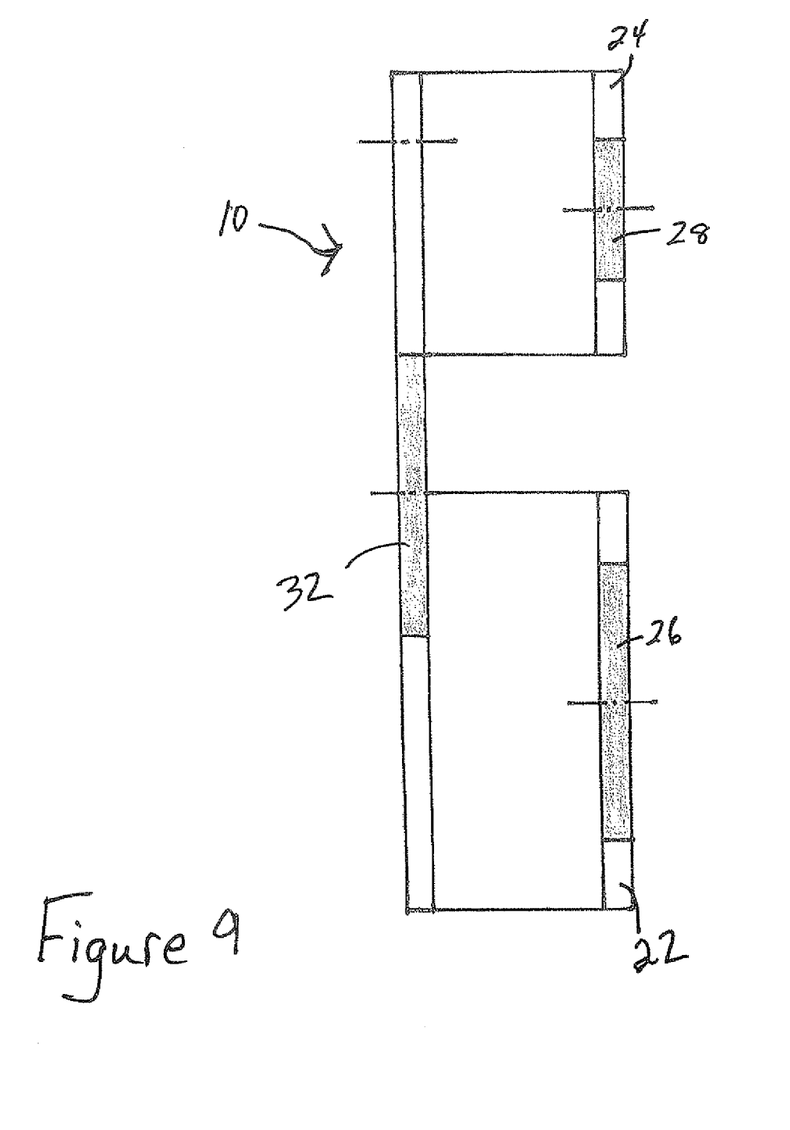
FIG. 9 is a back view of the first member shown in FIG. 7.
Figure 10A:
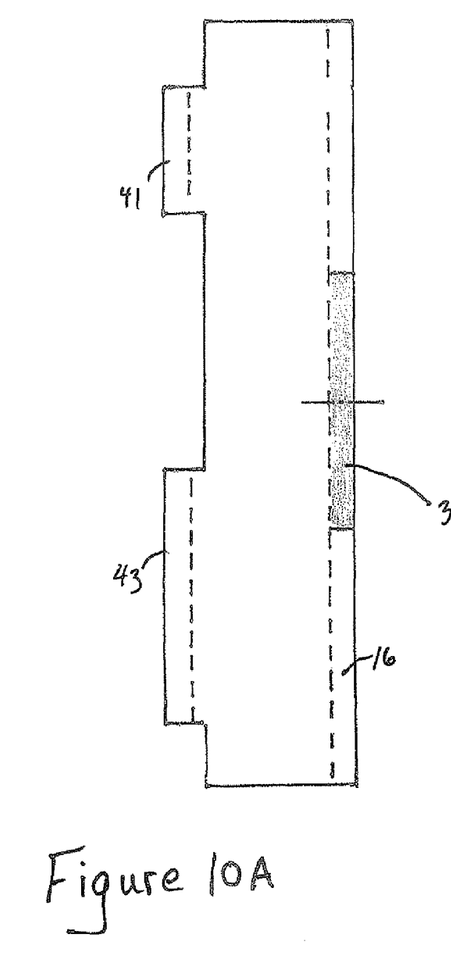
FIG. 10A is a front view of the second member shown in FIG. 7.
Figure 10B:
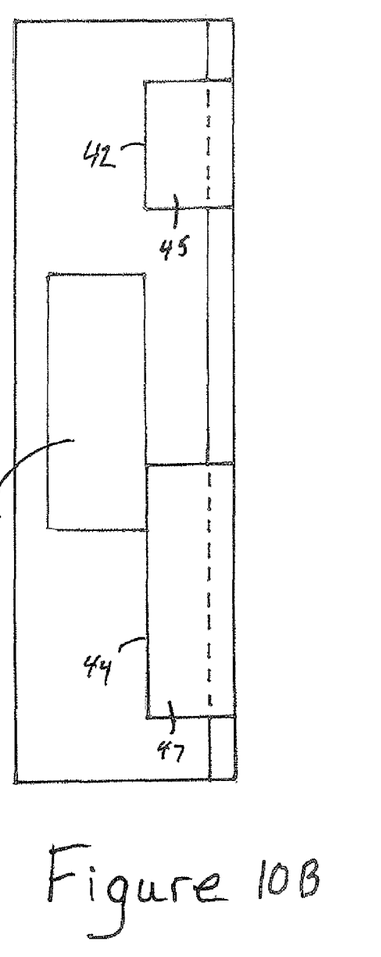
FIG. 10B is a side view of the second member shown in FIG. 7.
Figure 11A:
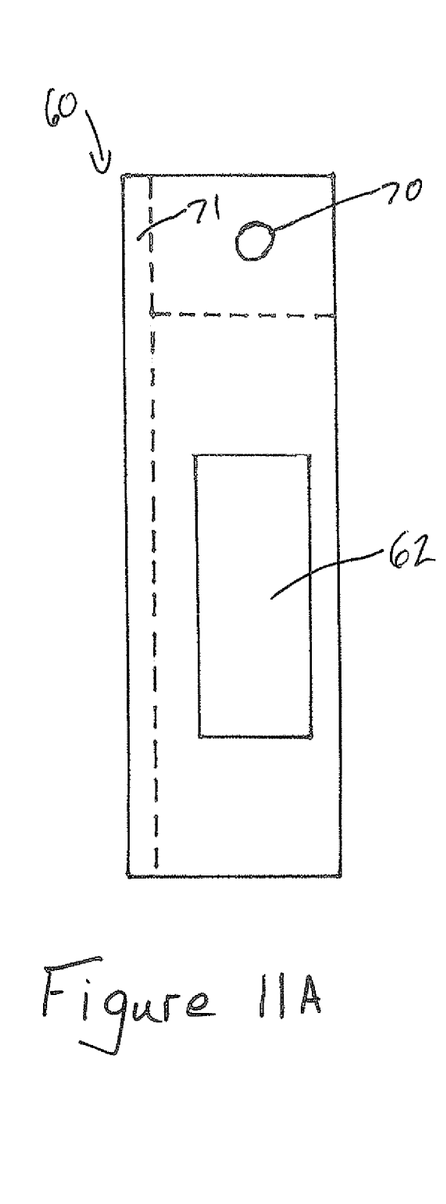
FIG. 11A is a side view of the latch shown in FIG. 7.
Figure 11B:
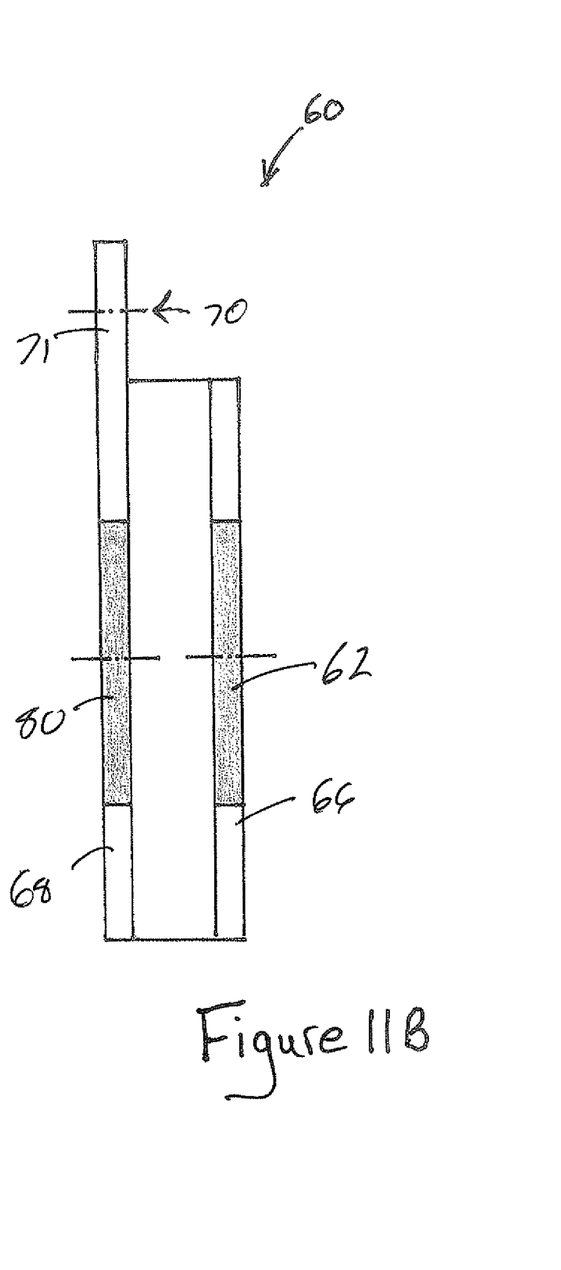
FIG. 11B is a front view of the latch shown in FIG. 7.

FIG. 6 is a top view of an embodiment of the present invention similar to that shown in FIGS. 3 and 4. As shown, first member 10 and second member 50 have been interlocked via first hook extension 40, second hook extension 38, first hook aperture 28 and second hook aperture 26. Latch 60 is shown in place over first member extension 31 and second member extension 39 and a securing cable has been passed through first securing aperture 32, second securing aperture 36, third securing aperture 62 and fourth securing aperture 80.

Another embodiment is shown in FIGS. 7 through 11B. In embodiments represented in these Figures, first member 10 does not include first flange 14. Second member 50 may configured such that first hook extension 40 and second hook extension 38 extend substantially perpendicular to plate 35 and tailing portions 45 and 47 may be substantially parallel to side member 16. Embodiments may be configured such that second flange 34 and side member 16 lie against each other when first member 10 and second member 50 are interlocked. See, e.g., FIG. 7. In certain embodiments, first securing aperture 32 may be located in side member 16. See, e.g. FIGS. 8 through 10B. In certain embodiments, latch 60 may be attached via pin aperture 70 to side member 16 or second flange 34. As shown, first hook extension 40 and second hook extension 38 may be of different widths. First hook aperture 28 and second hook aperture 26 may be of different widths to accommodate first hook extension 40 and second hook extension 38. Moreover, the various apertures of the present invention may be substantially circular, rounded, rectangular, etc.

Embodiments of the present disclosure may be made of steel, metal alloy, or other substantially rigid materials. Materials may be resistant to corrosion or anti-corrosives may be added to the materials in order to protect against corrosive forces such as salt water. Interlocking first member 10 and second member 50 via first hook extension 40, second hook extension 38, first hook aperture 28 and second hook aperture 26 provides substantial strength over pin hinge designs, increasing resistant to forces that may be applied in attempts to break the apparatus. Blocking the locking rings further prohibits the rod/reel combination from being disassembled. If an apparatus allowed for disassembly, a rod may be freely removed from the securing apparatus once it is separated from a reel. Accordingly, the present invention provides improved security against persistent thieves who may seek to disassemble a combination and/or break a locking device to get at either a rod or reel.

Embodiments of the present invention include improved methods of securing fishing rods and fishing reels against theft. Embodiments include simultaneously securing a reel to a rod such that locking rings of the rod are inaccessible when the combination is secured. Embodiments further include securing the combination to a third object such as a vessel or motor vehicle.

Embodiments of the present invention include methods of securing a fishing rod/reel combination, including: wrapping a first member having a first wrapping member and second wrapping member around the rod such that a neck of the reel lies between the first wrapping member and the second wrapping member; interlocking a second member with the first member via first and second hook extensions and first and second hook apertures; rotating the second member and first member together such that a first securing aperture of the first member and a second securing aperture of the second member substantially align; placing a latch around a portion of the first member and a portion of the second member such that the first securing aperture and the second securing aperture substantially align with a third and fourth securing aperture of the latch; and passing a security chain through each of the securing apertures. The security chain may be secured to a third object (e.g., boat, vehicle, etc.)

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. The specification and drawings are accordingly to be regarded in an illustrative rather than in a restrictive sense.

What is claimed is:

1. A fishing rod and fishing reel locking device, comprising:
    a first member, including a side member, a first wrapping member extending from the side member, a second wrapping member extending from the side member, and a first securing aperture;
    a second member, including a plate, a first hook extension extending from the plate, a second hook extension extending from the plate, and a second securing aperture; and
    a latch, including a third securing aperture and a fourth securing aperture;
    wherein the first wrapping member and the second wrapping member are curved;
    wherein the first wrapping member has a first hook aperture;
    wherein the second wrapping member has a second hook aperture;
    wherein the first member and the second member interlock;
    wherein the first securing aperture and the second securing aperture align when the first member and the second member are interlocked; and
    wherein the first securing aperture and the second securing aperture are aligned with and in between the third securing aperture and the fourth securing aperture when the latch overlies a portion of the first member and a portion of the second member.

2. The device of claim 1, further comprising:
    a flange portion attached to the side member of the first member; and
    a flange portion attached to the plate of the second member;
    wherein the first securing aperture is part of the flange portion of the first member; and
    wherein the second securing aperture is part of the flange portion of the second member.

3. The device of claim 1, wherein the latch is attached to the first member.

4. The device of claim 3, wherein the latch is rotatable along an axis.

5. The device of claim 1, wherein the latch is attached to the second member.

6. The device of claim 5, wherein the latch is rotatable along an axis.

7. The device of claim 1, further comprising: a security cable passed through each of the security apertures.

8. The device of claim 1, wherein a gap width between adjacent edges of the first wrapping member and the second wrapping member is configured to allow a neck of the reel to pass between the first wrapping member and the second wrapping member when the first member is wrapped around the rod.

9. The device of claim 8, wherein the gap width is 1 inch.

10. The device of claim 8, wherein the gap width is 1.5 inches.

11. The device of claim 1, wherein the first wrapping member has a first wrapping member width.

12. The device of claim 11, wherein the first wrapping member width is 1 inch.

13. The device of claim 11, wherein the first wrapping member width is one of 1.5 inches, 2 inches and 3 inches.

14. The device of claim 1, wherein the second wrapping member has a second wrapping member width.

15. The device of claim 14, wherein the second wrapping member width is 2.5 inches.

16. The device of claim 14, wherein the second wrapping member width is 3 to 4 inches.

17. An apparatus, comprising:
    a first member having a first wrapping member and a second wrapping member;
    a second member;
    a latch member; and one of the first member and the second member having a first hook aperture and a second hook aperture;

wherein the first member and second member interlock; and wherein each of the first member, the second member, and the latch member have securing apertures.

18. The apparatus of claim 17, wherein the first wrapping member includes the first hook aperture and the second wrapping member includes the second hook aperture.

19. The apparatus of claim 18, wherein the second member includes a first hook extension and a second hook extension.

20. The apparatus of claim of claim 19, wherein the first hook extension and the second hook extension align with the first hook aperture and the second hook aperture.

21. The apparatus of claim 17, further comprising one of a security cable, a security chain, and a padlock.

22. A method of securing a fishing rod/reel combination, comprising:

wrapping a first member having a first wrapping member and second wrapping member around the rod such that a neck of the reel lies between the first wrapping member and the second wrapping member;

interlocking a second member with the first member via first and second hook extensions and first and second hook apertures;

rotating the second member and first member together such that a first securing aperture of the first member and a second securing aperture of the second member substantially align;

placing a latch around a portion of the first member and a portion of the second member such that the first securing aperture and the second securing aperture substantially align with a third securing aperture and a fourth securing aperture of the latch; and passing one of a security chain, security cable, and padlock through each of the securing apertures.

23. The method of claim 22, further comprising: securing the security chain to a third object.

\* \* \* \* \*